United States Patent
You

(10) Patent No.: US 12,286,583 B1
(45) Date of Patent: Apr. 29, 2025

(54) POLYMER VISCOSITY REDUCER FOR WATER-BASED DRILLING FLUID AND PREPARATION METHOD THEREOF

(71) Applicant: YANGTZE UNIVERSITY, Jingzhou (CN)

(72) Inventor: Fuchang You, Jingzhou (CN)

(73) Assignee: YANGTZE UNIVERSITY, Jingzhou (CN)

(*) Notice: Subject to any disclaimer, the term of this patent is extended or adjusted under 35 U.S.C. 154(b) by 0 days.

(21) Appl. No.: 18/675,876

(22) Filed: May 28, 2024

(30) Foreign Application Priority Data

Dec. 19, 2023 (CN) .................. 202311765229.X

(51) Int. Cl.
*C09K 8/12* (2006.01)
*C08F 216/20* (2006.01)

(52) U.S. Cl.
CPC .............. *C09K 8/12* (2013.01); *C08F 216/20* (2013.01)

(58) Field of Classification Search
CPC . C09K 8/02; C09K 8/035; C09K 8/04; C09K 8/12; C09K 8/00; C08F 216/20
See application file for complete search history.

(56) References Cited

FOREIGN PATENT DOCUMENTS

| CN | 106432601 A | 2/2017 | |
|---|---|---|---|
| CN | 109694445 A | 4/2019 | |
| CN | 111808244 A | * 10/2020 | ........... C04B 24/165 |
| CN | 114573737 A | * 6/2022 | |
| WO | 2021/103473 A1 | 6/2021 | |

OTHER PUBLICATIONS

Fang (Y. Fang, Preparation and Characterization of Viscosity Reducing Polycarboxylate Superplasticizers with Different Molecular Structures, New Building Materials, pp. 104-108, 121, published on Apr. 30, 2017).*
Lv, S. et al., "Effects of Connection Mode Between Carboxyl Groups and Main Chains on Polycarboxylate Superplasticizer Properties," Journal of Applied Polymer Science, pp. 3925-3932 (2013).
Han Laiju et al., "Petroleum and natural gas industries - Drilling fluid testing on site—Part 1: Water-based drilling fluids," General Administration of Quality Supervision, Inspection and Quarantine of the People's Republic of China, Standardization Administration of the People's Republic of China, (Jun. 1, 2015).
Fang, Y., "The preparation and characterization of different molecular structure of high-velocity-typed polycarboxylate superplasticizer," New Building Materials, vol. 6, pp. 104-108 (2017).
CN Office Action dated Oct. 13, 2024 as received in Application No. 202311765229.X.

* cited by examiner

*Primary Examiner* — Kumar R Bhushan
(74) *Attorney, Agent, or Firm* — Maschoff Brennan

(57) ABSTRACT

Provided are a polymer viscosity reducer for a water-based drilling fluid and a preparation method thereof. The polymer viscosity reducer for the water-based drilling fluid is prepared from raw materials including, in parts by mass: 100 parts to 150 parts of water, 30 parts to 50 parts of acrylic acid, 10 parts to 20 parts of maleic anhydride, 40 parts to 60 parts of allyl polyethylene glycol, 3 parts to 6 parts of an initiator, 1 part to 3 parts of a pH regulator, 10 parts to 20 parts of a diamine, and 5 parts to 10 parts of a saturated organic acid.

14 Claims, No Drawings

POLYMER VISCOSITY REDUCER FOR WATER-BASED DRILLING FLUID AND PREPARATION METHOD THEREOF

CROSS REFERENCE TO RELATED APPLICATION

This patent application claims the benefit and priority of Chinese Patent Application No. 202311765229.X filed with the China National Intellectual Property Administration on Dec. 19, 2023, the disclosure of which is incorporated by reference herein in its entirety as part of the present application.

TECHNICAL FIELD

The present disclosure relates to the technical field of oilfield chemistry in petroleum drilling engineering, and in particular to a polymer viscosity reducer for a water-based drilling fluid and a preparation method thereof.

BACKGROUND

Oil and gas exploration and development have gradually moved towards areas with difficult geology. The harshness of geological conditions has brought great difficulty to drilling operations. Drilling fluid, regarding as the blood of oil and gas engineering field, is the first to bear the brunt. The drilling fluid not only faces complex formation lithology, but also faces a series of tests such as high temperature, high pressure, and environmental protection. Mudstone pollution, high temperature and high pressure, and environmental protection have become the three major problems restricting the progress of drilling fluid technology. The drilling of tight oil and gas and 10,000-meter-deep wells conducted in recent years have all faced the above three problems, and drilling fluid thickening is an important factor in regulating performance of the drilling fluid. Drilling fluid viscosity reducers are required to ensure that the drilling fluid maintains a stable viscosity during the drilling. For a long time, the viscosity reducers for the drilling fluid have always been based on sulfonated tannins, sulfonated tannin extracts, and sulfonated polymers containing sulfur element, or even earlier were mainly iron-chromium lignosulfonate containing heavy metals. This type of treatment agent brings great problems to post-treatment of drilling fluid and drilling cuttings after the drilling operations. Even if the technology of keeping the drilling fluid and the drilling cuttings from falling to the ground is implemented at this stage, it is still inevitable that the presence of sulfur element and heavy metals during the treatment makes it difficult to discharge treated sewage and sludge, resulting in a mountain of treated waste that is difficult to solve.

Based on this, researchers have done a lot of research on environmental-friendly drilling fluid treatment agents. However, these treatment agents either have limited temperature resistance effect or poor viscosity reducing effect, which seriously restricts the progress of the drilling fluid technology, especially in the drilling fluid viscosity reducers.

SUMMARY

In view of this, the present disclosure is intended to provide a polymer viscosity reducer for a water-based drilling fluid and a preparation method thereof. In the present disclosure, the polymer viscosity reducer for the water-based drilling fluid shows a desirable viscosity-reducing effect and high temperature resistance, does not contain sulfur element, and is safe and environmental-friendly.

To achieve the above objects, the present disclosure provides the following technical solutions.

The present disclosure provides a polymer viscosity reducer for a water-based drilling fluid, which is prepared from raw materials including, in parts by mass:

100 parts to 150 parts of water, 30 parts to 50 parts of acrylic acid, 10 parts to 20 parts of maleic anhydride, 40 parts to 60 parts of allyl polyethylene glycol, 3 parts to 6 parts of an initiator, 1 part to 3 parts of a pH regulator, 10 parts to 20 parts of a diamine, and 5 parts to 10 parts of a saturated organic acid.

In some embodiments, the allyl polyethylene glycol has a number-average molecular weight of 300 to 700.

In some embodiments, the initiator includes at least one selected from the group consisting of ammonium persulfate and potassium persulfate.

In some embodiments, the pH regulator includes one or more selected from the group consisting of sodium hydroxide, potassium hydroxide, and triethanolamine (TEA).

In some embodiments, the diamine includes one or more selected from the group consisting of ethylenediamine, N,N-dimethylpropylenediamine, hexamethylenediamine, and polyetheramine.

In some embodiments, the saturated organic acid includes one or more selected from the group consisting of formic acid, acetic acid, and citric acid.

The present disclosure further provides a method for preparing the polymer viscosity reducer for the water-based drilling fluid described in the above solutions, including the following steps:

mixing the diamine and the maleic anhydride to obtain a mixture, and subjecting the mixture to amidation to obtain an amidation product;

mixing the amidation product, the water, the acrylic acid, the allyl polyethylene glycol, the pH regulator, and the initiator to obtain a mixed material, and subjecting the mixed material to polymerization to obtain a polymerization product; and mixing the polymerization product and the saturated organic acid to obtain a mixed solution, and subjecting the mixed solution to neutralization to obtain the polymer viscosity reducer for the water-based drilling fluid.

In some embodiments, the amidation is conducted at a temperature of 60° C. to 80° C. for 1 h to 2 h.

In some embodiments, the polymerization is conducted at a temperature of 45° C. to 70° C. for 2 h to 3 h.

In some embodiments, the neutralization is conducted at room temperature to 70° C. for 1 h to 2 h.

The present disclosure provides a polymer viscosity reducer for a water-based drilling fluid, which is prepared from raw materials including, in parts by mass: 100 parts to 150 parts of water, 30 parts to 50 parts of acrylic acid, 10 parts to 20 parts of maleic anhydride, 40 parts to 60 parts of allyl polyethylene glycol, 3 parts to 6 parts of an initiator, 1 part to 3 parts of a pH regulator, 10 parts to 20 parts of a diamine, and 5 parts to 10 parts of a saturated organic acid. In the present disclosure, the diamine and the maleic anhydride are subjected to amidation to obtain an amidation product; and the amidation product, the acrylic acid and the allyl polyethylene glycol are then subjected to polymerization to form a polymer with an amino-based epitaxial chain. A polymer formed from the maleic anhydride and the acrylic acid has a certain dilution and viscosity-reducing effect, but the viscosity-reducing effect is still insufficient. In the present disclosure, the introduced allyl polyethylene glycol provides a polyethylene glycol epitaxial chain on this basis, which not only improves hydrophilicity, but also enhances expansion ability of molecular chains, laying foundation for further viscosity reduction of the polymer. The polymer with the allyl polyethylene glycol could be adsorbed on a surface of each tiny particle and generate electrostatic repulsion to disperse the particles, improve the lubrication between the particles, weaken internal friction, and achieve the reduction in macroscopic viscosity. Furthermore, the diamine is also introduced to provide an epitaxial chain with amino groups in the polymer. The amino groups have strong adsorption capacity and could directionally adsorb mudstone, thus inhibiting and releasing expansion and dispersion of clay. In addition, the amino groups also improve the compatibility of the viscosity reducer with other treatment agents in the drilling fluid, improve viscosity-reducing performance, and could further improve the temperature resistance.

The polymer viscosity reducer for the water-based drilling fluid provided by the present disclosure shows a desirable viscosity-reducing effect and high temperature resistance, and has a strong filter loss reduction effect on the basis of the desirable viscosity reduction performance. The polymer viscosity reducer also does not contain sulfur element, is safe and environmental-friendly, and has a wide range of applications. Results of examples show that the polymer viscosity reducer for the water-based drilling fluid has a temperature resistance of 200° C., a viscosity reduction rate of not less than 90%, and a filter loss of less than 20 mL.

DETAILED DESCRIPTION OF THE EMBODIMENTS

The present disclosure provides a polymer viscosity reducer for a water-based drilling fluid, which is prepared from raw materials including, in parts by mass:

100 parts to 150 parts of water, 30 parts to 50 parts of acrylic acid, 10 parts to 20 parts of maleic anhydride, 40 parts to 60 parts of allyl polyethylene glycol, 3 parts to 6 parts of an initiator, 1 part to 3 parts of a pH regulator, 10 parts to 20 parts of a diamine, and 5 parts to 10 parts of a saturated organic acid.

In the present disclosure, unless otherwise specified, all raw materials are commercially available products well known to those skilled in the art.

In some embodiments of the present disclosure, in parts by mass, the raw materials for preparing the polymer viscosity reducer for the water-based drilling fluid includes 10 parts to 20 parts, preferably 15 parts to 20 parts of the maleic anhydride.

In some embodiments of the present disclosure, based on the parts by mass of the maleic anhydride, the raw materials for preparing the polymer viscosity reducer for the water-based drilling fluid includes 10 parts to 20 parts, preferably 15 parts to 20 parts of the diamine. In some embodiments of the present disclosure, the diamine includes one or more selected from the group consisting of ethylenediamine, N,N-dimethylpropylenediamine, hexamethylenediamine, and polyetheramine, and preferably is a mixture of the ethylenediamine, the N,N-dimethylpropylenediamine, the hexamethylenediamine, and the polyetheramine. In some embodiments of the present disclosure, when the diamine is a mixture of the ethylenediamine, the N,N-dimethylpropylenediamine, the hexamethylenediamine, and the polyetheramine, a mass ratio of the ethylenediamine, the N,N-dimethylpropylenediamine, the hexamethylenediamine, and the polyetheramine is 2:2:3:3. In the present disclosure, the diamine and the maleic anhydride could undergo amidation. The diamine provides an epitaxial chain with amino groups in a polymer. The amino groups have strong adsorption capacity and could directionally adsorb mudstone, thus inhibiting and releasing expansion and dispersion of clay. In addition, the amino groups also improve compatibility of the viscosity reducer with other treatment agents in the drilling fluid, improve viscosity-reducing performance, and could further improve the temperature resistance.

In some embodiments of the present disclosure, based on the parts by mass of the maleic anhydride, the raw materials for preparing the polymer viscosity reducer for the water-based drilling fluid includes 100 parts to 150 parts, and preferably 120 parts to 150 parts of the water. In some embodiments of the present disclosure, the water is deionized water.

In some embodiments of the present disclosure, based on the parts by mass of the maleic anhydride, the raw materials for preparing the polymer viscosity reducer for the water-based drilling fluid includes 30 to 50 parts, and preferably 40 parts to 50 parts of the acrylic acid.

In some embodiments of the present disclosure, based on the parts by mass of the maleic anhydride, the raw materials for preparing the polymer viscosity reducer for the water-based drilling fluid includes 40 parts to 60 parts, and preferably 50 parts to 60 parts of the allyl polyethylene glycol. In some embodiments of the present disclosure, the allyl polyethylene glycol has a number-average molecular weight of 300 to 700, and preferably 400 to 500.

In some embodiments of the present disclosure, based on the parts by mass of the maleic anhydride, the raw materials for preparing the polymer viscosity reducer for the water-based drilling fluid includes 1 part to 3 parts, and preferably 2 parts to 3 parts of the pH regulator. In some embodiments of the present disclosure, the pH regulator includes one or more selected from the group consisting of sodium hydroxide, potassium hydroxide, and TEA.

In some embodiments of the present disclosure, based on the parts by mass of the maleic anhydride, the raw materials for preparing the polymer viscosity reducer for the water-based drilling fluid includes 3 parts to 6 parts, and preferably 5 parts to 6 parts of the initiator. In some embodiments of the present disclosure, the initiator includes at least one selected from the group consisting of ammonium persulfate and potassium persulfate. In some embodiments of the present disclosure, when the initiator includes the ammonium persulfate and the potassium persulfate, a mass ratio of the ammonium persulfate and the potassium persulfate is 3:7 or 7:3.

In the present disclosure, a product from the amidation between a diamine and maleic anhydride could undergo polymerization with acrylic acid and allyl polyethylene glycol under the action of an initiator. A polymer formed from the maleic anhydride and the acrylic acid has a certain dilution and viscosity-reducing effect. The introduced allyl polyethylene glycol provides a polyethylene glycol epitaxial chain on this basis, which not only improves hydrophilicity, but also enhances expansion ability of the molecular chain, laying foundation for further viscosity reduction of the polymer. The polymer with allyl polyethylene glycol could be adsorbed on a surface of each tiny particle and generate electrostatic repulsion to disperse the particles, improve lubrication between the particles, weaken internal friction, and achieve a reduction in macroscopic viscosity.

In some embodiments of the present disclosure, based on the parts by mass of the maleic anhydride, the raw materials for preparing the polymer viscosity reducer for the water-based drilling fluid includes 5 parts to 10 parts, and preferably 8 parts to 10 parts of the saturated organic acid. In some embodiments of the present disclosure, the saturated organic acid includes one or more selected from the group consisting of formic acid, acetic acid, and citric acid, and preferably is a mixture of the formic acid, the acetic acid, and the citric acid. In some embodiments of the present disclosure, when the saturated organic acid includes the formic acid, the acetic acid, and the citric acid, a mass ratio of the formic acid, the acetic acid, and the citric acid is 1:3:6. In the present disclosure, the saturated organic acid serves to neutralize excess amine in the reaction.

A polymer viscosity reducer for a water-based drilling fluid provided by the present disclosure shows a desirable viscosity-reducing effect and high temperature resistance, and has a strong filter loss reduction effect on the basis of the desirable viscosity reduction performance. The polymer viscosity reducer also does not contain sulfur element, is safe and environmental-friendly, and has a wide range of applications, thereby overcoming the problem that existing sulfonated viscosity reducers are difficult to meet environmental protection requirements.

The present disclosure further provides a method for preparing the polymer viscosity reducer for the water-based drilling fluid, including the following steps:

mixing the diamine and the maleic anhydride to obtain a mixture, and subjecting the mixture to amidation to obtain an amidation product;

mixing the amidation product, the water, the acrylic acid, the allyl polyethylene glycol, the pH regulator, and the initiator to obtain a mixed material, and subjecting the mixed material to polymerization to obtain a polymerization product; and mixing the polymerization product and the saturated organic acid to obtain a mixed system, and subjecting the mixed system to neutralization to obtain the polymer viscosity reducer for the water-based drilling fluid.

In the present disclosure, the diamine and the maleic anhydride are mixed, and then subjected to amidation to obtain an amidation product. In some embodiments of the present disclosure, the amidation (hydrogen replacement amidation) is conducted at a temperature of 60° C. to 80° C. (in a molten state), and preferably 70° C. to 80° C. In some embodiments of the present disclosure, the amidation (hydrogen replacement amidation) is conducted for 1 h to 2 h, and preferably 1.5 h to 2 h. In some embodiments of the present disclosure, the diamine is added into a reactor under stirring, heated to a temperature of 60° C. to 70° C., the maleic anhydride is slowly added thereto, and a resulting mixture is subjected to amidation at a temperature of 60° C. to 80° C.

In the present disclosure, after the amidation product is obtained, the amidation product, the water, the acrylic acid, the allyl polyethylene glycol, the pH regulator, and the initiator are mixed, and subjected to polymerization to obtain a polymerization product. In some embodiments of the present disclosure, mixing the amidation product, the water, the acrylic acid, the allyl polyethylene glycol, the pH regulator, and the initiator is conducted by: cooling the reactor containing the amidation product to room temperature, slowly adding the water, the acrylic acid, and the allyl polyethylene glycol, then adding the pH regulator, stirring for 0.5 h to 1 h, and adding the initiator. In some embodiments of the present disclosure, the polymerization is conducted at a temperature of 45° C. to 70° C. for 2 h to 3 h. In some embodiments of the present disclosure, a mixed material obtained by the mixing is heated to a temperature of 45° C. to 55° C., and the temperature is controlled not to exceed 70° C. during the reaction.

In the present disclosure, after the polymerization product is obtained, the polymerization product and the saturated organic acid are mixed, and subjected to neutralization to obtain the polymer viscosity reducer for the water-based drilling fluid. In some embodiments of the present disclosure, the reactor containing the polymerization product is cooled to room temperature, and the saturated organic acid is slowly added under stirring. In some embodiments of the present disclosure, the neutralization is conducted at a temperature ranging from room temperature to 70° C. for 1 h to 2 h. In the present disclosure, the neutralization is the neutralization of excess amine using the saturated organic acid.

In the present disclosure, the polymer viscosity reducer in a liquid form is obtained after the neutralization. In the present disclosure, the liquid polymer viscosity reducer could also be spray-dried to obtain the polymer viscosity reducer in a powder form.

To further describe the present disclosure, the polymer viscosity reducer for the water-based drilling fluid and the preparation method thereof provided by the present disclosure will be described in detail below in conjunction with examples, but these examples could not be understood as limiting the scope of the present disclosure.

Example 1

A polymer viscosity reducer for a water-based drilling fluid was prepared from raw materials consisting of (in parts by mass):

150 parts of water, 50 parts of acrylic acid, 20 parts of maleic anhydride, 60 parts of allyl polyethylene glycol, 6 parts of an initiator, 3 parts of a pH regulator, 20 parts of a diamine, and 10 parts of a saturated organic acid. Where the water was deionized water, the allyl polyethylene glycol had a number-average molecular weight of 400, the initiator was ammonium persulfate, the pH regulator was sodium hydroxide, the diamine was ethylenediamine, and the saturated organic acid was acetic acid.

A method for preparing the polymer viscosity reducer for the water-based drilling fluid was performed as follows.

The diamine was added to a three-necked flask under stirring, heated to a temperature of 70° C., and the maleic anhydride was slowly added thereto. A resulting mixture was subjected to hydrogen replacement amidation at a temperature of 80° C. for 2 h to obtain an amidation product.

The three-necked flask containing the amidation product was cooled to room temperature, then the water, the acrylic acid, and the allyl polyethylene glycol were slowly added, the pH regulator was added thereto, and stirred for 1 h. The initiator was added to a resulting system, subjected to polymerization to obtain a polymerizatio product. The polymerizatio product was heated to a temperature of 55° C. The polymerization was conducted violently for 3 h, where the temperature in the three-necked flask was controlled not to exceed 70° C.

The three-necked flask was cooled to room temperature, and the saturated organic acid was slowly added under stirring, and a resulting mixed system was subjected to neutralization to neutralize excess amine. Where the neutralization of materials in the three-necked flask was conducted at a temperature not greater than 70° C. for 2 h to obtain a liquid polymer viscosity reducer.

Example 2

A polymer viscosity reducer for a water-based drilling fluid was prepared from raw materials consisting of (in parts by mass):

100 parts of water, 30 parts of acrylic acid, 10 parts of maleic anhydride, 40 parts of allyl polyethylene glycol, 3 parts of an initiator, 1 part of a pH regulator, 10 parts of a diamine, and 5 parts of a saturated organic acid. Where the water was deionized water, the allyl polyethylene glycol had a number-average molecular weight of 700, the initiator was potassium persulfate, the pH regulator was TEA, the diamine was N,N-dimethylpropylenediamine, and the saturated organic acid was formic acid.

A method for praparing the polymer viscosity reducer for the water-based drilling fluid was performed as follows.

The diamine was added to a three-necked flask under stirring, heated to a temperature of 60° C., and the maleic anhydride was slowly added thereto. A resulting mixture was subjected to hydrogen replacement amidation at a temperature of 60° C. for 1 h to obtain an amidation product.

The three-necked flask containing the amidation product was cooled to room temperature, then the water, the acrylic acid, and the allyl polyethylene glycol were slowly added, the pH regulator was added thereto, and stirred for 0.5 h. The initiator was added to a resulting system, subjected to polymerization to obtain a polymerizatio product. The polymerizatio product was heated to a temperature of 45° C. The polymerization was conducted violently for 2 h, where the temperature in the three-necked flask was controlled not to exceed 70° C.

The three-necked flask was cooled to room temperature, and the saturated organic acid was slowly added under stirring, and a resulting mixed system was subjected to neutralization to neutralize excess amine. Where the neutralization of materials in the three-necked flask was conducted at a temperature not greater than 70° C. for 1 h to obtain a liquid polymer viscosity reducer.

Example 3

A polymer viscosity reducer for a water-based drilling fluid was prepared from raw materials consisting of (in parts by mass):

150 parts of water, 30 parts of acrylic acid, 10 parts of maleic anhydride, 40 parts of allyl polyethylene glycol, 3 parts of an initiator, 1 part of a pH regulator, 10 parts of a diamine, and 5 parts of a saturated organic acid. Where the water was deionized water, the allyl polyethylene glycol had a number-average molecular weight of 300, the initiator was ammonium persulfate and potassium persulfate (with a mass ratio being 3:7), the pH regulator was potassium hydroxide, the diamine was a mixture of ethylenediamine, N,N-dimethylpropylenediamine, hexamethylenediamine, and polyetheramine (with a mass ratio being 2:2:3:3), and the saturated organic acid was a mixture of formic acid, acetic acid, and citric acid (with a mass ratio being 1:3:6).

A method for preparing the polymer viscosity reducer for the water-based drilling fluid was performed as follows.

The diamine was added to a three-necked flask under stirring, heated to a temperature of 70° C., and the maleic anhydride was slowly added thereto. A resulting mixture was subjected to hydrogen replacement amidation at a temperature of 60° C. for 1 h to obtain an amidation product;

The three-necked flask containing the amidation product was cooled to room temperature, then the water, the acrylic acid, and the allyl polyethylene glycol were slowly added, the pH regulator was added thereto, and stirred for 1 h. The initiator was added to a resulting system, subjected to polymerization to obtain a polymerizatio product. The polymerizatio product was heated to a temperature of 55° C. The polymerization was conducted violently for 2 h, where the temperature in the three-necked flask was controlled not to exceed 70° C.

The three-necked flask was cooled to room temperature, and the saturated organic acid was slowly added under stirring, and a resulting mixed system was subjected to neutralization to neutralize excess amine. Where the neutralization of materials in the three-necked flask was conducted at a temperature not greater than 70° C. for 2 h to obtain a liquid polymer viscosity reducer. The liquid polymer viscosity reducer was spray-dried to obtain a powder polymer viscosity reducer.

Example 4

A polymer viscosity reducer for a water-based drilling fluid was prepared from raw materials consisting of (in parts by mass):

120 parts of water, 40 parts of acrylic acid, 15 parts of maleic anhydride, 50 parts of allyl polyethylene glycol, 5 parts of an initiator, 2 parts of a pH regulator, 15 parts of a diamine, and 8 parts of a saturated organic acid. Where the water was deionized water, the allyl polyethylene glycol had a number-average molecular weight of 500, the initiator was a mixture of ammonium persulfate and potassium persulfate (with a mass ratio being 7:3), the pH regulator was a mixture of sodium hydroxide and potassium hydroxide (with a mass ratio being 4:6), the diamine was hexamethylenediamine, and the saturated organic acid was citric acid.

A method for preparing the polymer viscosity reducer for the water-based drilling fluid was performed as follows.

The diamine was added to a three-necked flask under stirring, heated to a temperature of 65° C., and the maleic anhydride was slowly added thereto. A resulting mixture was subjected to hydrogen replacement amidation at a temperature of 70° C. for 1.5 h to obtain an amidation product;

The three-necked flask containing the amidation product was cooled to room temperature, then the water, the acrylic acid, and the allyl polyethylene glycol were slowly added, the pH regulator was added thereto, and stirred for 1 h. The initiator was added to a resulting system, subjected to polymerization to obtain a polymerizatio product. The polymerizatio product was heated to a temperature of 50° C. The polymerization was conducted violently for 2 h, where the temperature in the three-necked flask was controlled not to exceed 70° C.

The three-necked flask was cooled to room temperature, and the saturated organic acid was slowly added under stirring, and a resulting mixed system was subjected to neutralization to neutralize excess amine. Where the neutralization of materials in the three-necked flask was conducted at a temperature not greater than 70° C. for 1 h to obtain a liquid polymer viscosity reducer. The liquid polymer viscosity reducer was spray-dried to obtain a powder polymer viscosity reducer.

Comparative Example

Sulfonated tannin was used as a viscosity reducer.

The polymer viscosity reducers prepared in the examples were subjected to performance testing.

(I) The polymer viscosity reducers obtained in the above examples were evaluated according to an evaluation method in the following bentonite muds, and the performance test was conducted according to an apparent viscosity test method in GB/T16783.1-2014 "Petroleum and natural gas industries-Field testing of drilling fluids-Part 1: Water-based drilling fluids".

Experimental process:

A basic formulation consists of 100 mL fresh water+8 g bentonite+0.2 g sodium hydroxide+0.5 g sodium carbonate+2 g the viscosity reducers of Examples 1 to 2 (or +1 g the viscosity reducers of Examples 3 to 4 and Comparative Example). The basic formulation was compared with a basic formulation without adding the viscosity reducer of the Examples.

A weighted formulation consists of: 100 mL fresh water+6 g bentonite+0.3 g sodium hydroxide+1.0 g sodium carbonate+3 g the viscosity reducers of Examples 1 to 2 (or +1.5 g the viscosity reducers of Examples 3 to 4 and Comparative Example)+barite, where the barite is in such an amount that the weighed formulation has a density of 2.0 g/cm$^3$. The weighted formulation was compared with a weighted formula without adding the viscosity reducer of the Examples.

The experimental results are shown in Table 1:

Table 1 Viscosity-reducing properties of the polymer viscosity reducers in the bentonite muds tion and fluid loss reduction effects of the polymer viscosity reducers in the examples of the present disclosure are better than those of the sulfonated tannin of the comparative example, and the sulfonated tannin of the comparative example is limited in application since the sulfonated tannin contains sulfur element.

(II) The polymer viscosity reducers in the above examples were added to a high-temperature water-based drilling fluid system commonly used in drilling for evaluation. The rheological properties and fluid loss properties of the drilling fluid were evaluated according to GB/T16783.1-2014 "Petroleum and natural gas industries—Field testing of drilling fluids—Part 1: Water-based fluids".

Experimental process:

The high-temperature water-based drilling fluid system consists of: 100 mL fresh water+3 g bentonite+0.3 g sodium hydroxide+0.3 g sodium carbonate+1.2 g high-temperature tackifier+2.5 g high-temperature polymer fluid loss agent+2 g natural asphalt+7 g potassium chloride+10 g sodium chloride+3 g the viscosity reducers of Examples 1 to 2 (or +1.5 g the viscosity reducers of Examples 3 to 4, or +3 g the viscosity reducer of Comparative Example)+barite+20 g mudstone contaminant (recorded as 20%), where the barite is in such an amount that the high-temperature water-based drilling fluid system has a density of 2.0 g/cm$^3$. The high-

| Sample | Viscosity reducer sample | T State | AV | Φ3 | LTLP | JNL | The flow characteristic of mud after aging |
|---|---|---|---|---|---|---|---|
| Basic formulation | 0 | 150 after aging for 24 h | 44 | 20 | 28.0 | | Extremely viscous |
| | Example 1 | 150 after aging for 24 h | 3 | 0.5 | 11.2 | 93.2 | Excellent fluidity |
| | Example 2 | 150 after aging for 24 h | 3 | 0.5 | 11.4 | 93.2 | Excellent fluidity |
| | Example 3 | 150 after aging for 24 h | 4 | 1 | 12.6 | 90.9 | Excellent fluidity |
| | Example 4 | 150 after aging for 24 h | 4 | 1 | 12.8 | 90.9 | Excellent fluidity |
| | Comparative Example | 150 after aging for 24 h | 7 | 2 | 13.2 | 84.1 | Excellent fluidity |
| Weighted formulation | 0 | 150 after aging for 24 h | 126 | 36 | 20.6 | | Almost non-fluid |
| | Example 1 | 150 after aging for 24 h | 11 | 3 | 8.2 | 91.3 | Excellent fluidity |
| | Example 2 | 150 after aging for 24 h | 11 | 3 | 8.6 | 91.3 | Excellent fluidity |
| | Example 3 | 150 after aging for 24 h | 12 | 4 | 9.2 | 90.5 | Excellent fluidity |
| | Example 4 | 150 after aging for 24 h | 12 | 4 | 9.4 | 90.5 | Excellent fluidity |
| | Comparative Example | 150 after aging for 24 h | 19 | 8 | 12.7 | 84.9 | Excellent fluidity |

As shown in Table 1, the polymer viscosity reducers in the examples of the present disclosure and the sulfonated tannin in the comparative example both have desirable viscosity-reducing effect in the bentonite muds. The viscosity reductemperature water-based drilling fluid system was compared with a high-temperature water-based drilling fluid system without adding the viscosity reducer of the Examples or the mudstone contaminant.

The experimental results are shown in Table 2:

Table 2 Performance of the polymer viscosity reducers in drilling fluid

| Mudstone contaminant | Viscosity reducer sample | T | State | PV | YP | Φ3 | LTLP | HTHP | The flow characteristic of mud after aging |
|---|---|---|---|---|---|---|---|---|---|
| 0% | 0% | 200 | after aging for 48 h | 55 | 10 | 9 | 5.2 | 14.8 | |
| 20% | 0% | 200 | after aging for 48 h | 100 | 42 | 36 | 20.2 | 51.4 | Thick and almost non-fluid |
| 20% | Example 1 | 200 | after aging for 48 h | 44 | 9 | 8 | 4.4 | 12.2 | Excellent fluidity |
| 20% | Example 2 | 200 | after aging for 48 h | 48 | 11 | 10 | 5.0 | 13.8 | Excellent fluidity |
| 20% | Example 3 | 200 | after aging for 48 h | 42 | 8 | 8 | 4.6 | 11.4 | Excellent fluidity |
| 20% | Example 4 | 200 | after aging for 48 h | 45 | 9 | 7 | 4.8 | 11.6 | Excellent fluidity |
| 20% | Comparative Example | 200 | after aging for 48 h | 64 | 15 | 14 | 7.8 | 32.6 | Extremely viscous |

As shown in Table 2, the polymer viscosity reducers in the examples of the present disclosure have desirable compatibility in high-temperature water-based drilling fluid system. When the drilling fluid is contaminated by high-concentration mudstone, the drilling fluid thickened seriously. At this time, the polymer viscosity reducer could restore the viscosity of the drilling fluid and reduce fluid loss.

Notes: the meaning of each parameter in Table 1 and Table 2 is as follows:

T: aging temperature of the drilling fluid, °C.;
AV: apparent viscosity of the drilling fluid, mPa·s;
PV: plastic viscosity of the drilling fluid, mPa·s;
YP: yield point of the drilling fluid, Pa;
Φ3: 3-turn reading of a six-speed rotational viscometer, dimensionless;
LTLP: the cumulative filtrate loss for 30 min obtained for all drilling fluid samples using the standard API Filter Press at 0.7 MPa;
HTHP: high-temperature and high-pressure filtrate loss of the drilling fluid (3.5 MPa, T, 30 min), mL;
JNL: AV reduction rate before and after adding viscosity reducers to the formulation, %.

The above descriptions are merely preferred embodiments of the present disclosure rather than limitations to the present disclosure in any form. It should be noted that a person of ordinary skill in the art may further make several improvements and modifications without departing from the principle of the present disclosure, but such improvements and modifications should be deemed as falling within the protection scope of the present disclosure.

What is claimed is:

1. A polymer viscosity reducer for a water-based drilling fluid, which is prepared from raw materials consisting of, in parts by mass:
   100 parts to 150 parts of water, 30 parts to 50 parts of acrylic acid, 10 parts to 20 parts of maleic anhydride, 40 parts to 60 parts of allyl polyethylene glycol, 3 parts to 6 parts of an initiator, 1 part to 3 parts of a pH regulator, 10 parts to 20 parts of a diamine, and 5 parts to 10 parts of a saturated organic acid,
   wherein the polymer viscosity reducer for the water-based drilling fluid is prepared by a method comprising the following steps:
   mixing the diamine and the maleic anhydride to obtain a mixture, and subjecting the mixture to amidation to obtain an amidation product, wherein the amidation is conducted at a temperature of 60° C. to 80° C. for 1 h to 2 h;
   mixing the amidation product, the water, the acrylic acid, the allyl polyethylene glycol, the pH regulator, and the initiator to obtain a mixed material, and subjecting the mixed material to polymerization to obtain a polymerization product; and
   mixing the polymerization product and the saturated organic acid to obtain a mixed solution, and subjecting the mixed solution to neutralization to obtain the polymer viscosity reducer for the water-based drilling fluid.

2. The polymer viscosity reducer for the water-based drilling fluid of claim 1, wherein the allyl polyethylene glycol has a number-average molecular weight of 300 to 700.

3. The polymer viscosity reducer for the water-based drilling fluid of claim 1, wherein the initiator comprises at least one selected from the group consisting of ammonium persulfate and potassium persulfate.

4. The polymer viscosity reducer for the water-based drilling fluid of claim 1, wherein the pH regulator comprises one or more selected from the group consisting of sodium hydroxide, potassium hydroxide, and triethanolamine (TEA).

5. The polymer viscosity reducer for the water-based drilling fluid of claim 1, wherein the diamine comprises one or more selected from the group consisting of ethylenediamine, N,N-dimethylpropylenediamine, hexamethylenediamine, and polyetheramine.

6. The polymer viscosity reducer for the water-based drilling fluid of claim 1, wherein the saturated organic acid comprises one or more selected from the group consisting of formic acid, acetic acid, and citric acid.

7. A method for preparing the polymer viscosity reducer for the water-based drilling fluid of claim 1, comprising the following steps:
   mixing the diamine and the maleic anhydride to obtain the mixture, and subjecting the mixture to the amidation to obtain the amidation product, wherein the amidation is conducted at the temperature of 60° C. to 80° C. for 1 h to 2 h;
   mixing the amidation product, the water, the acrylic acid, the allyl polyethylene glycol, the pH regulator, and the initiator to obtain the mixed material, and subjecting the mixed material to the polymerization to obtain the polymerization product; and mixing the polymerization product and the saturated organic acid to obtain the mixed solution, and subjecting the mixed solution to the neutralization to obtain the polymer viscosity reducer for the water-based drilling fluid.

8. The method of claim 7, wherein the polymerization is conducted at a temperature of 45° C. to 70° C. for 2 h to 3 h.

9. The method of claim 7, wherein the neutralization is conducted at room temperature to 70° C. for 1 h to 2 h.

10. The method of claim 7, wherein the allyl polyethylene glycol has a number-average molecular weight of 300 to 700.

11. The method of claim 7, wherein the initiator comprises at least one selected from the group consisting of ammonium persulfate and potassium persulfate.

12. The method of claim 7, wherein the pH regulator comprises one or more selected from the group consisting of sodium hydroxide, potassium hydroxide, and TEA.

13. The method of claim 7, wherein the diamine comprises one or more selected from the group consisting of ethylenediamine, N,N-dimethylpropylenediamine, hexamethylenediamine, and polyetheramine.

14. The method of claim 7, wherein the saturated organic acid comprises one or more selected from the group consisting of formic acid, acetic acid, and citric acid.

* * * * *